United States Patent
Nowak

[11] Patent Number: 5,230,257
[45] Date of Patent: Jul. 27, 1993

[54] REMOTE CONTROL ASSEMBLY WITH SNAP-IN TERMINAL

[75] Inventor: Joseph M. Nowak, Berkley, Mich.

[73] Assignee: Teleflex Incorporated, Limerick, Pa.

[21] Appl. No.: 959,486

[22] Filed: Oct. 9, 1992

Related U.S. Application Data

[63] Continuation-in-part of Ser. No. 788,868, Nov. 7, 1991, abandoned.

[51] Int. Cl.⁵ .............................................. F16C 1/10
[52] U.S. Cl. ................... 74/502.4; 74/502.6; 74/501.5 R; 248/71; 248/74.3
[58] Field of Search ............ 74/502, 501.5, 502.2, 74/502.4, 502.6; 403/71, 69, 70; 248/221, 74, 74.3; 24/16 PB; 52/716.2

[56] References Cited

U.S. PATENT DOCUMENTS

| | | | |
|---|---|---|---|
| 2,937,834 | 5/1960 | Orenick et al. | 248/71 |
| 3,015,869 | 1/1962 | Rapata | 248/71 |
| 3,398,600 | 9/1968 | White et al. | 74/502.4 |
| 3,427,894 | 2/1969 | Tschanz | 74/502 |
| 4,011,770 | 3/1977 | Webb | 74/502.4 |
| 4,564,163 | 1/1986 | Barnett | 248/71 |
| 4,624,155 | 11/1986 | Wing | 74/501 R |
| 4,669,688 | 6/1987 | Itoh et al. | 248/71 |
| 4,829,845 | 5/1989 | Suzuki | 74/502.4 |
| 4,869,123 | 9/1989 | Stocker | 74/502 |
| 4,944,475 | 7/1990 | One et al. | 248/71 |
| 5,039,040 | 8/1991 | Idjakiren | 248/71 |

*Primary Examiner*—Carl D. Friedman
*Assistant Examiner*—Winnie Yip
*Attorney, Agent, or Firm*—Reising, Ethington, Barnard, Perry & Milton

[57] ABSTRACT

A motion transmitting remote control assembly (10) of the type for transmitting motion along a curved path by a flexible core element (12) to a control member (26). A terminal (22) is attachment to an end (16) of the core element (12) and includes a base (32) extending therefrom for closely fitting within an attachment opening (28) of the control member (26) in order to position the terminal (22) at a final axial position. A retaining member (40) extends from the base (32) for retaining the base (32) closely fit within the attachment opening (28). A locator member (54), disposed at the end (44) of the retaining member (40), locates the terminal (22) at the final axial position prior to retaining the base (32) within the attachment opening (28); thus, the terminal (22) is maintained in the final axial position while both initially locating and finally retaining the terminal (22) in close fit with the control member (26).

11 Claims, 2 Drawing Sheets

REMOTE CONTROL ASSEMBLY WITH SNAP-IN TERMINAL

This is a continuation-in-part of copending application Ser. No. 788,868 filed on Nov. 7, 1991, now abandoned.

BACKGROUND OF THE INVENTION

1. Technical Field

The subject invention relates to a motion transmitting remote control assembly of the type for transmitting motion along a curved path by a flexible core element movably supported within a flexible conduit. More specifically, the subject invention relates to an assembly including a terminal secured to an end of the core element and having a snap-in retaining member extending therefrom for engaging a control member.

2. Description of the Related Art

Many remote control assemblies include a terminal secured to an end of a core element for securing the core element to a control member. Such terminals may be attached to the control member in a number of different ways. For example, U.S. Pat. No. 4,624,155 to Wing discloses a terminal attached to a control member by way of a rivet member. Other known means for attaching terminals to control members include J-clips and bolt assemblies. Unfortunately, such techniques for attaching terminals to control members are limited to applications where the attachment point between the control member and terminal is easily accessible. That is, in order to attach the terminal to the control member, one must be able to manipulate an attachment member, such as a J-clip, at the attachment point between the terminal and control member.

In applications where access to the control member is limited, it is known in the art to utilize terminals having a male "snap-in" retaining member, commonly known in the art as "christmas tree" retainers, for engagably interlocking with an attachment opening in the control member. Control members often include a plurality of attachment openings so that the terminal may be positioned precisely at a preferred position relative to the control member.

To attach such a terminal to the control member, the retaining member is often initially located just inside one of a plurality of attachment openings in the control member in order to determine the preferred position of the terminal relative to the control member. Once initially located, the retaining member is fully inserted into the attachment opening and snapped into a locking engagement therewith thus positioning the terminal at a final locked position. An example of a core element terminal having such a snap-in retaining member is shown in U.S. Pat. No. 3,398,600 to White. Terminals used in other applications also commonly use snap-in retaining members. For example, U.S. Pat. Nos. 2,937,834 to Orenick, 4,564,163 to Barnett, and 4,669,688 to Itoh all disclose cable clamps having similar snap-in retaining members.

A problem encountered with such snap-in retaining members is that the position in which the terminal is initially located at is different than the final locked position. That is, the terminal is displace relative to the control member as the retaining member is moved from an initial locating position to a finally locked position.

Another problem encountered is maintaining the position of the terminal relative to the control member, once the terminal is locked into its final position; that is, the interfit between the terminal and the attachment opening in the control member is not rigid, but rather elastic. Hence, when the terminal is permitted to move relative to the control member.

Thus, it is difficult to accurately locate and position the terminal relative to the control member. Moreover, when such snap-in retaining members are fully locked into engagement with an attachment opening, they generally need to be broken in order to detach the terminal from the control member. Thus, it is imperative that the terminal be properly position relative to the control member prior to locking the retaining member thereto and once locked into final position, the terminal must not be permitted to move.

SUMMARY OF THE INVENTION AND ADVANTAGES

The subject invention is a motion transmitting remote control assembly of the type for transmitting motion along a curved path by a flexible core element to a control member. The invention comprises; a motion transmitting core element at least partially disposed along a longitudinal axis and extending between a first end and a second end, a terminal adapted for attachment to the first end of the core element, at least one rigid base extending from the terminal for a close fit within an attachment opening of the control member to position the terminal at a final axial position relative to the control member, and retaining means extending from the base and having a distal end for retaining the base in close fit within the attachment opening of the control member. The invention is characterized by locator means disposed at the distal end of the retaining means for locating the terminal at the final axial position relative to the control member prior to closely fitting the base within the attachment opening of the control member thereby positioning the terminal in the final axial position while initially locating and finally retaining the terminal in engagement with the control member.

An advantage of utilizing a locator means disposed at the distal end of the retaining means is that the terminal is maintained in the final axial position while initially being located and finally retained in close fit with the control member. Thus, the final axial position of the terminal may be determined prior to locking the terminal to the control member.

BRIEF DESCRIPTION OF THE DRAWINGS

Other advantages of the subject invention with be readily appreciated as the same becomes better understood by reference to the following detailed description when considered in connection with the accompanying drawings wherein.

DETAILED DESCRIPTION OF THE PREFERRED EMBODIMENT

Figure 1:
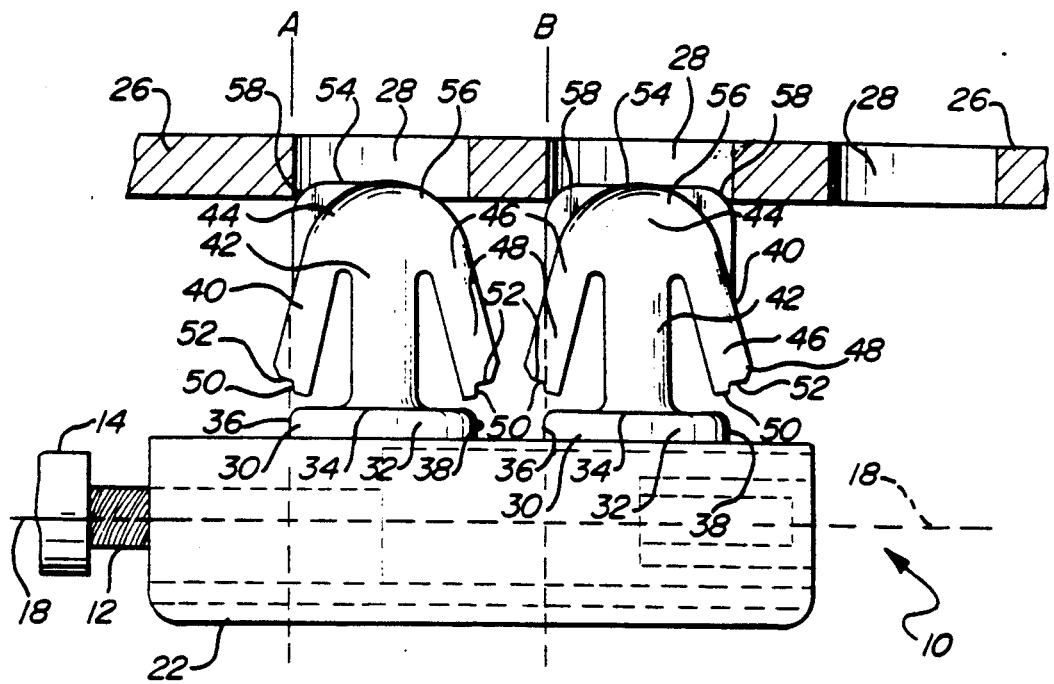
FIG. 1 is a side view partially broken away of the subject invention showing the locator means partially inserted within the attachment openings of the control member.

Referring now to the drawings wherein like numerals indicate like or corresponding parts throughout the several views, a motion transmitting remote control assembly of the type for transmitting motion along a curved path by a flexible core element to a control member is generally shown at 10 in the Figures.

Figure 2:
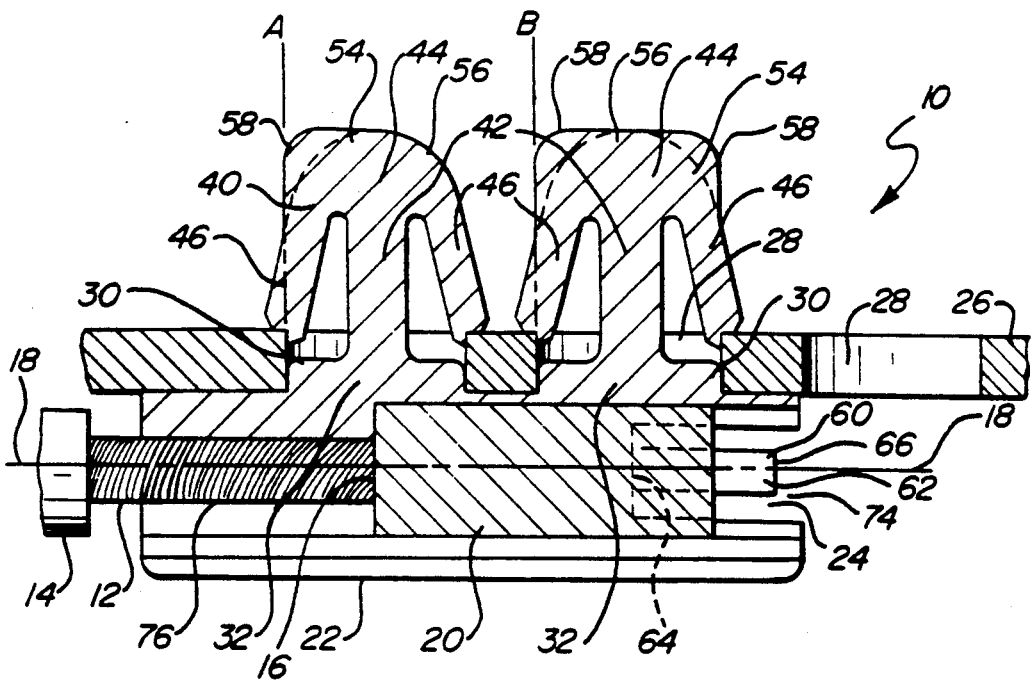
FIG. 2 is a side view in cross section of the subject invention showing the bases retained in close fit with the attachment openings of the control member.

Turning to FIGS. 1 and 2, the subject invention is shown in side view including a motion transmitting core element 12 slidably disposed within a conduit 14. The core element 12 extends between a first 16 and second end (not shown) and defines a longitudinal axis 18. A slug 20 or enlarged head is secured to either end of the core element 12 or may be secured to both ends thereof. The slug may be molded integrally about the end of the core element 12 or may be clamped, clasped, or attached by other means commonly known in the art.

A terminal 22 is provided for receiving the slug 20 to connect the first end 16 of the core element 12 to a control member. More specifically, the terminal 22 includes a chamber 24 disposed therein for receiving the slug 20. The slug 20 is positioned within the chamber 24 in order to secure the core element 12 to the terminal 22.

A control member, such as a lever arm or the like is shown at 26 and includes a number of attachment openings 28 disposed axially therealong. At least one tenon 30 but preferably two tenons 30 extend outward from the terminal 22 for closely fitting within the attachment openings 28 to attach the terminal 22 to the control member 26. Each tenon 30 comprises a base 32 having a circular outer periphery 34 with axially aligned rear 36 and front 38 extremities for closely fitting within the attachment openings 28 of the control member 26. The bases 32 are preferably integral with the terminal 22 and extend therefrom, transversely from the longitudinally axis 18, as shown in FIGS. 1 and 2. Additionally, the bases 32 are preferably rigid, that is, the shape and dimension of the bases 32 is not deformable. Once the bases 32 are tightly fit within the attachment openings 28, the rigid nature of the bases 32 do not permit the terminal to move relative to the control member 26.

Retaining means 40 are provided for retaining each base 32 in close fit within the attachment openings 28 so that the terminal is located at a final axial position. The final axial position corresponds to the position of the terminal 22 when the bases 32 are retained in close fit with the attachment openings 28 of the control member 26. Vertical dotted lines A and B are shown in FIGS. 1 and 2 to serve as references for indicated the final axial position.

The retaining means 40 includes a stem 42 extending from at least one base 32 to a distal end 44 spaced from the terminal 22. As shown in FIGS. 1 and 2, the retaining means 40 extends transversely from the longitudinal axis 18. At least one and preferably two biasing arms 46 are positioned on opposite sides of each stem 42 and extend downward from the distal end 44 to a far end 48 positioned adjacent the terminal 22 for biasing the control member 26 against the terminal 22. As best shown in FIG. 2, the far end 48 of the biasing arms 46 include a projection 50 extending therefrom for engaging the attachment opening 28 of the control member 26. The far end 48 of each biasing arm 46 additionally includes an abutment 52 positioned adjacent the projection 50 for abutting against the control member 26 to retain the terminal 22 against the control member 26.

Locator means 54 are preferably disposed at the distal end 44 of each stem 42 and include an enlarged head 56 for locating the terminal at the final axial position prior to closely fitting the bases 32 within the attachment openings 28 of the control member 26. FIG. 1 shows the terminal 22 initially located axially with respect the control member 26. That is, the locator means 54 are inserted just within the attachment openings 28 of the control member 26. In such a location, the axial position of the terminal 22 may be determined before retaining the terminal 22 in place (as shown in FIG. 2). If the terminal's initially located position needs adjustment, the terminal 22 may be moved axially until the locator means 54 correspond with the proper attachment openings 28. At such a location, the terminal may be locked into place by forcing the retainer means 40 into the attachment openings 28 until the bases 32 are in close fit therein, as shown in FIG. 2.

Each enlarged head 56 includes at least one flank 58 axially aligned with the rear 36 or front 38 extremity of the base 32 positioned therebelow and extends from the distal end 44 of the retaining means 40 and along the biasing arm 46 toward the base 32, as shown in FIGS. 1, 2, 4 and 5. The flank 58 adds to the mass of the biasing arm 46 and as a result, adds strength and stability to the biasing arm 46. Thus, once the terminal 22 is engaged with an aperture 28, the holding power of the biasing arm 46 is increased due to the added strength and support afforded by the flank 58. That is, the flank 58 on each enlarged head 56 is aligned with either the front 38 or rear 36 extremity of the base 32 connected thereto by the stem 42. Alternatively, the enlarged heads 56 may include flanks 58 axially aligned with both the front 38 and rear 36 extremities of their corresponding bases 32. Also, each terminal 22 may include enlarged heads 56 wherein some of the heads 56 have one axially aligned flank 58 and other heads 56 have two axially aligned flanks 58, as shown in FIGS. 1 and 2. It will be appreciated by those skilled in the art that various combinations of axially aligned flanks 58 are possible and that only one axially aligned flank 58 is required. However, addition flanks 58 may further aid in locating the terminal 22 but are not essential.

Figure 3:
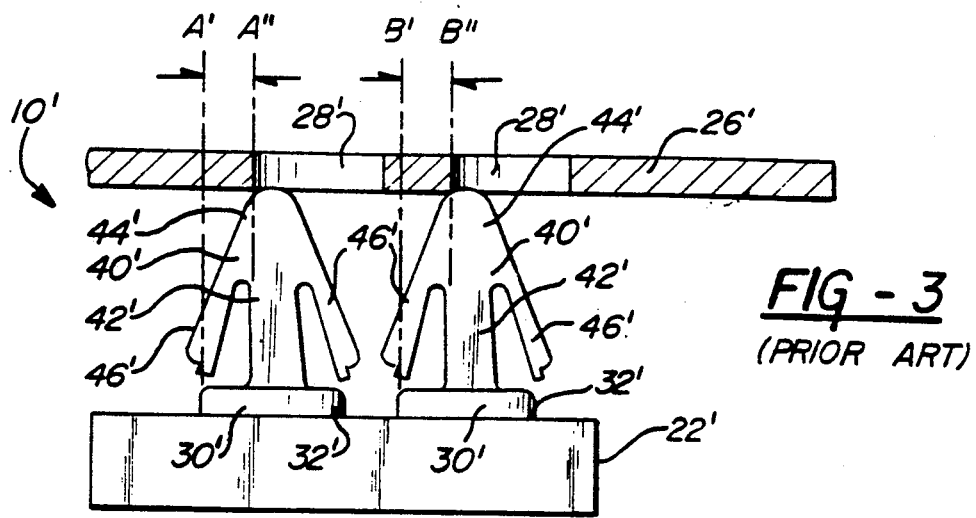
FIG. 3 is a side view partially broken away showing a prior art embodiment of the terminal.

FIG. 3 illustrates a prior art assembly 10' wherein corresponding previously described parts are denoted as primed numbers. The prior art assembly 10' does not include locator means, that is, no flanks are provided at the distal end 44' of each stem 42'. Thus, the axial position of the terminal 22', as the retaining means 40' is initially located within the attachment openings 28' (designated by reference line A" and B"), is different than the final axial position (designated by reference line A' and B') where the bases 32' are closely fit and retained within the attachment openings 28' (not shown). Unlike the prior art assembly 10', the instant invention's utilization of locator means 54 permits the terminal 22 to be maintained in the final axial position while both initially locating and finally retaining the terminal 22 in engagement with the control member 26.

Slug retaining means 60 are provided for retaining the slug 20 within the terminal 22 during normal operation.

Figure 6:
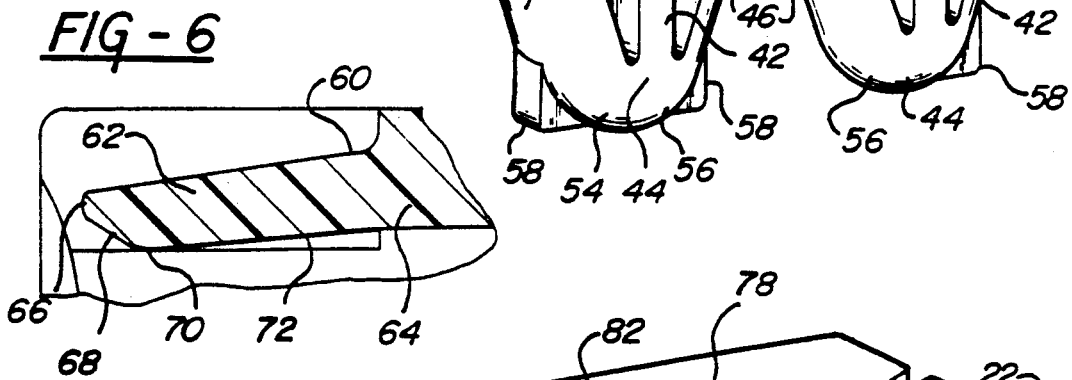
FIG. 6 is an enlarged fragmentary cross sectional view taken along line 6—6 of FIG. 5 showing the slug retaining means.

Additionally, the slug retaining means 60 permits the slug 20 to be released from the terminal 22 in order to disconnect the core element 12 from the terminal 22 thus allowing the core element 12 and control member 26 to be serviced independently from one another. The slug retaining means 60, best shown in FIGS. 2, 4 and 6, includes at least one biasing finger 62 having a first end 64 integral with the terminal 22 and extending to a second end 66 disposed within the chamber 24. The biasing finger 62 includes a shoulder 68 extending from the second end 66 to an inner extremity 70 for engaging the slug 20 to resist movement of the slug 20 into the chamber 24. The biasing finger 62 additionally includes a ramp surface 72 extending from the first end 64 to the shoulder 68 for engaging the slug 20 once inside the chamber 24, to resist movement of the slug 20 out of the chamber 24. Thus, although movement of the slug 20 into and out of the chamber 24 is resisted, the slug 20 may be moved relative to the chamber 24. Accordingly, the slug retaining means 60 prevents inadvertent disassembly between the slug 20 and terminal 22 while still allowing the slug 20 to be intentionally disassembled form the terminal 22.

Figure 4:
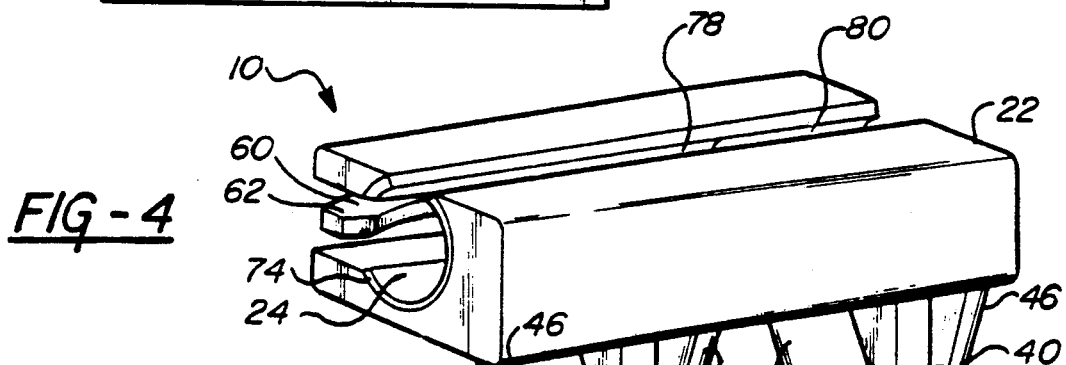
FIG. 4 is a perspective view of the preferred embodiment of subject invention showing the slot axially extending along the terminal.
Figure 5:
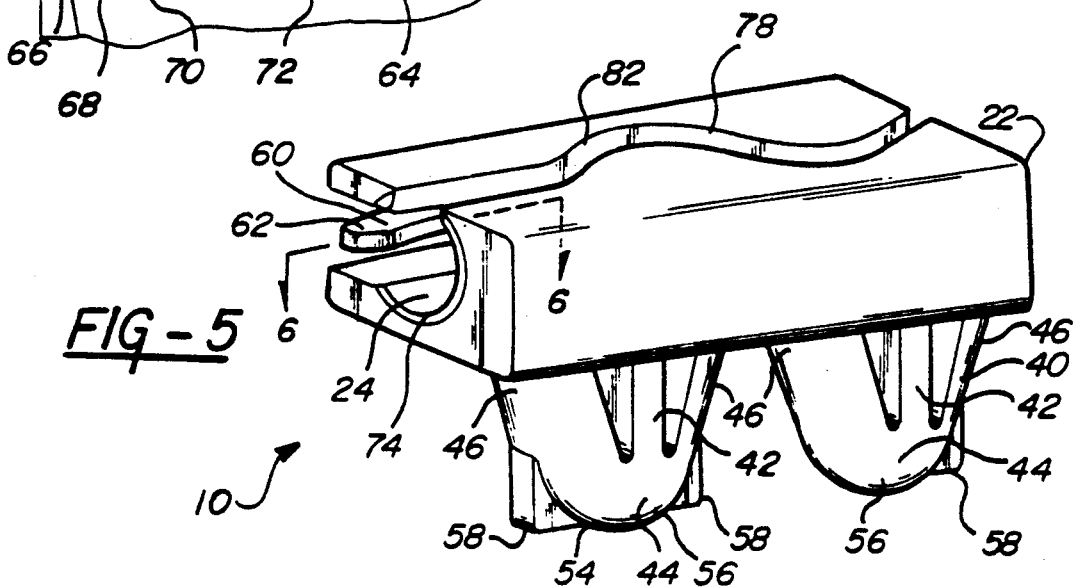
FIG. 5 is a perspective view of an alternative embodiment of the subject invention showing the slot extending through a serpentine path along the terminal.

Turning to FIGS. 4 and 5, an access 74 opening is shown in the terminal 22, positioned adjacent the chamber 24, for permitting the slug 20 to be slidably positioned within the chamber 24. A tunnel 76 extends along the longitudinal axis 18 (as best shown in FIGS. 1 and 2), through the terminal 22 and chamber 24, for supporting the core element 12 therein. The tunnel 76 is of larger in dimension than the diameter of the core element 12 so that the core element 12 may move therein without resistance. However, the tunnel 76 is smaller in dimension than the slug 20 (and chamber 24) thus preventing the slug 20 from moving therethrough.

A slot 78 is disposed along the terminal 22, adjacent the chamber 24 and tunnel 76, for permitting the core element 12 to be positioned within the tunnel 76. Preferably, the slot 78 extends along a longitudinal path 80 spaced from and parallel with the longitudinal axis 18 (shown in FIG. 4). Alternatively, the slot 78 may extend along a serpentine path 82 spaced from the longitudinal axis 18 as shown in FIG. 5. The serpentine slot requires that the core element 12 to be slightly bent in order to be inserted within the tunnel 76. Once the core element 12 is positioned inside the tunnel 76, the core element 12 is retained longitudinally therein due to the serpentine shape required in order for the core element 12 to be moved out of the tunnel 76 through the serpentine slot.

The invention has been described in an illustrative manner, and it is to be understood that the terminology which has been used is intended to be in the nature of words of description rather than limitation.

Obviously, many modifications and variations of the instant invention are possible in light of the above teachings. It is therefore, to be understood that within the scope of the appended claims, the invention may be practiced otherwise than as specifically described.

What is claimed is:

1. A motion transmitting remote control assembly of the type for transmitting motion along a curved path by a flexible core element to a control member, said assembly comprising;
   a motion transmitting core element (12) at least partially disposed along a longitudinal axis (18) and including a first end (16);
   a terminal (22) secured to and movable with said first end (16) of said core element (12) and having at least one rigid base (32) extending from said terminal (22) for a close fit within an attachment opening (28) of the control member (26) to position said terminal (22) at a final axial position relative to the control member (26);
   retaining means (40) extending from said base (32) and having a distal end (44) spaced from said base (32) and at least one biasing arm (46) extending from said distal end (44) and toward said base (32) for retaining said base (32) in close fit within the attachment opening (28) of the control member (26);
   locator means (54) disposed at said distal end (44) of said retaining means (40) for locating said terminal (22) at the final axial position relative to the control member (26) prior to closely fitting said base (32) within the attachment opening (28) of the control member (26) and characterized by said locator means (54) including at least one flank (58) extending outwardly from said distal end (44) of said retaining means (40) and along said biasing arm (46) toward said base (32), said flank (58) integral with and upwardly extending from said biasing arm (46) for adding strength and stability to said biasing arm (46).

2. An assembly as set forth in claim 1 further characterized by said base (32) having an outer periphery (34) with axially aligned rear (36) and front (38) extremities for closely fitting within the attachment opening (28) of the control member (26).

3. An assembly as set forth in claim 2 further characterized by said locator means (54) axially aligned with one of said rear (36) and front (38) extremities.

4. An assembly as set forth in claim 3 further characterized by said locator means (54) axially aligned with both said rear (36) and front (38) extremities.

5. An assembly as set forth in either claim 3 or 4 further characterized by said retaining means (40) including a stem (42) extending between said base (32) and said locator means (54).

6. An assembly as set forth in claim 5 further characterized by said biasing arm (46) extending downward from said locator means (54) to a far end (48) positioned adjacent said terminal 22 for retaining the control member (26) against said terminal (22).

7. An assembly as set forth in claim 6 further characterized by said far end (48) of said biasing arm (46) including a projection (50) extending therefrom for engaging the attachment opening (28) of the control member (26).

8. An assembly as set forth in claim 7 further characterized by said far end (48) of said biasing arm (46) including an abutment (52) positioned adjacent said projection (50) for abutting against said control member (26) to retain said terminal (22) against the control member (26).

9. An assembly as set forth in claim 6 further characterized by said retaining means (40) including two biasing arms (46) positioned on opposite sides of said stem (42).

10. An assembly as set forth in claim 1 further characterized by said base (32) extending transversely from said longitudinal axis (18).

11. An assembly as set forth in claim 1 further characterized by said retaining means (40) extending transversely from said longitudinal axis (18).

* * * * *